United States Patent [19]

Sites

[11] Patent Number: 5,442,571
[45] Date of Patent: Aug. 15, 1995

[54] METHOD AND APPARATUS FOR CACHE MISS REDUCTION BY SIMULATING CACHE ASSOCIATIVITY

[75] Inventor: Richard L. Sites, Boylston, Mass.

[73] Assignee: Digital Equipment Corporation, Maynard, Mass.

[21] Appl. No.: 250,315

[22] Filed: May 27, 1994

Related U.S. Application Data

[63] Continuation of Ser. No. 716,397, Jun. 17, 1991, abandoned.

[51] Int. Cl.⁶ .............................................. G06F 12/08
[52] U.S. Cl. ................................... 364/403; 395/460; 395/500; 395/416
[58] Field of Search ............... 395/425, 400, 800, 500, 395/406; 364/578

[56] References Cited

U.S. PATENT DOCUMENTS

| | | | |
|---|---|---|---|
| 5,101,485 | 3/1992 | Perazzoli, Jr. | 395/400 |
| 5,119,290 | 6/1992 | Loo et al. | 395/400 |
| 5,175,834 | 12/1992 | Sawai | 395/425 |
| 5,210,843 | 5/1993 | Ayers | 395/425 |

OTHER PUBLICATIONS

Patterson et al, "Computer Architective-A Quantitative Approach", Morgan Kaufmann Publishers, Inc., 1990, pp. 419–424, 441–444, 454–474.
Hamacher et al, "Computer Organization", McGraw-Hill, 1984, pp. 307–313.
Smith, "Cache Memory Design: An Evolving Art", IEEE Spectrum, Dec. 1987, pp. 40–44.
IBM Tech. Disc. Bulletin, "Page Allocation Control", pp. 334–337, Jan. 1990.
IBM Tech. Discl. Bulletin, "Cache Miss History Table", pp. 5978–5980, Apr. 1983.

Primary Examiner—Ellis B. Ramirez
Assistant Examiner—L. Donaghue
Attorney, Agent, or Firm—Arthur W. Fisher; Gary E. Ross

[57] ABSTRACT

A computer system using virtual memory addressing and having a direct-mapped cache is operated in a manner to simulate the effect of a set associative cache by detecting cache misses and remapping pages in the main memory so that memory references which would have caused thrashing can instead coexist in the cache. Two memory addresses which are in different pages but which map to the same location in the cache may not reside in the direct-mapped cache at the same time, so alternate reference to these addresses by a task executing on the CPU would cause thrashing. However, if the location of one of these addresses in main memory is changed, the data items having these addresses can coexist in the cache, and performance will be markedly improved because thrashing will no longer result. For a CPU executing a virtual memory operating system, a page of data or instructions can be moved to a different physical page frame but remain the same virtual address. This is accomplished by simply updating the page-mapping tables to reflect the new physical location of the page, and copying the data from the old page frame to the new one. The thrashing condition is detected and corrected dynamically by latching cache miss addresses and periodically sampling the latch, then remapping pages containing the addresses found upon sampling. The direct-mapped cache must be large enough to hold two or more pages.

25 Claims, 3 Drawing Sheets

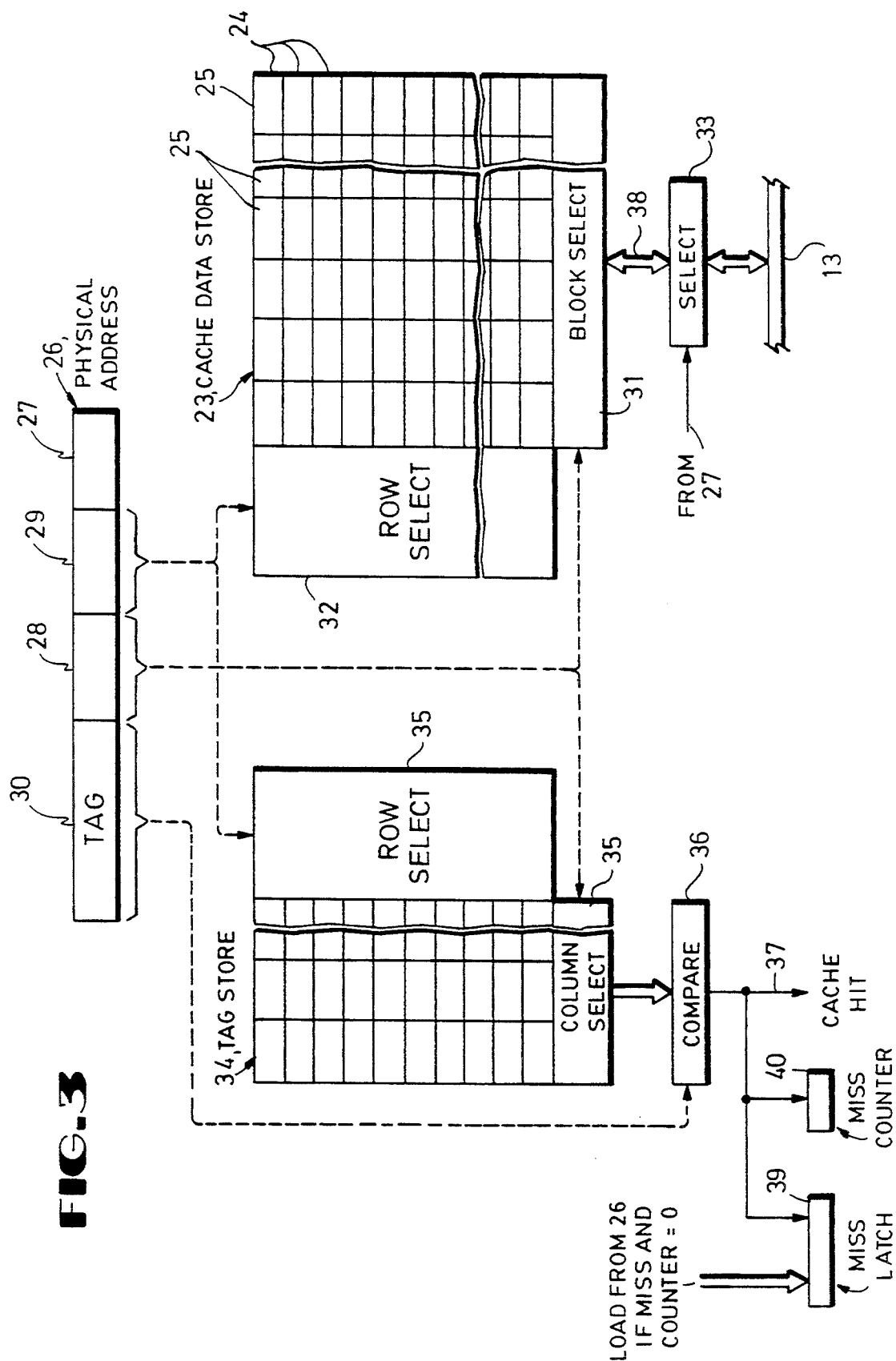

METHOD AND APPARATUS FOR CACHE MISS REDUCTION BY SIMULATING CACHE ASSOCIATIVITY

This application is a continuation of application Ser. No. 07/716,397, filed Jun. 17, 1991, abandoned.

BACKGROUND OF THE INVENTION

This invention relates to computer operation, and more particularly to a method of simulating the performance of a set-associative cache using a direct-mapped cache in a computer using a virtual memory.

As the speed of processors increases, the use of fast cache memory in computer systems becomes more important. For example, a high speed RISC processor of the type disclosed in my copending application Ser. No. 547,630, filed Jun. 29, 1990, may be constructed to operate at a CPU cycle time of 5-nsec, and execute an instruction during each cycle (due to the RISC concepts implemented). If the main memory has a cycle time of 300-nsec, it can be calculated that the CPU will spend 95% of its time waiting for memory, using cache hit rates that are now typical. To bring the memory performance more in line with the CPU, the cache memory is made hierarchical, providing primary, secondary, and, in some cases, third level caches, and of course the speed of the cache memories is increased as much as is economical. Nevertheless, the hit rate for the cache must be increased to achieve acceptable performance for these high-speed CPUs.

Cache memories are constructed in either direct-mapped architecture or N-way associative. A direct-mapped cache allows a given data item to be stored at only one place in the cache, so the hit rate is lower, but the advantage of a direct-mapped cache is that the circuitry is simple and very fast. An N-way associative cache allows a given data item to be stored at any of N different places in the cache, and this produces a higher hit rate than a direct-mapped cache of the same size. The higher hit rate of an N-way associative cache is a result of the increased flexibility of placement of information in the cache.

It would be desirable to be able to employ a direct-mapped cache in a high-performance computer system for the speed and simplicity of construction of this type of cache, but yet achieve higher cache hit rates as are inherent in N-way associative caches.

SUMMARY OF THE INVENTION

In accordance with one embodiment of the invention, a computer system having a direct-mapped cache is operated in a manner to simulate the effect of a set associative cache. This method is useful in a CPU executing a virtual memory type of operating system, where data is handled in pages and the cache is accessed via physical addresses. The method includes detecting cache misses and then remapping the pages in the main memory which contain the addresses of the detected cache misses, so that memory references that would otherwise cause thrashing can coexist in the cache.

Two memory addresses which are in different physical page frames but which map to the same location in the cache may not reside in the direct-mapped cache at the same time; alternate reference to these two addresses by a task executing on the CPU would cause thrashing. However, if the location of one of these addresses in main memory is changed, the data items having these addresses can coexist in the cache, and performance will be markedly improved because thrashing will no longer result. For a CPU executing a virtual memory operating system, a page of data or instructions can be moved to a different physical page frame but remain the same virtual address. This is accomplished by simply updating the page-mapping tables to reflect the new physical location of the page, and copying the data from the old page frame to the new one. The thrashing condition is detected and corrected dynamically by latching cache miss addresses and periodically sampling the latch, then remapping pages containing the addresses found upon sampling. The direct-mapped cache must be large enough to hold two or more pages. For a cache holding substantially more than four pages, the simulated technique of the invention may yield higher associativity than is typically economical to build in hardware.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 3 is an electrical diagram of a cache memory used in the system of FIG. 1, according to the invention;

DETAILED DESCRIPTION OF SPECIFIC EMBODIMENTS

Figure 1:
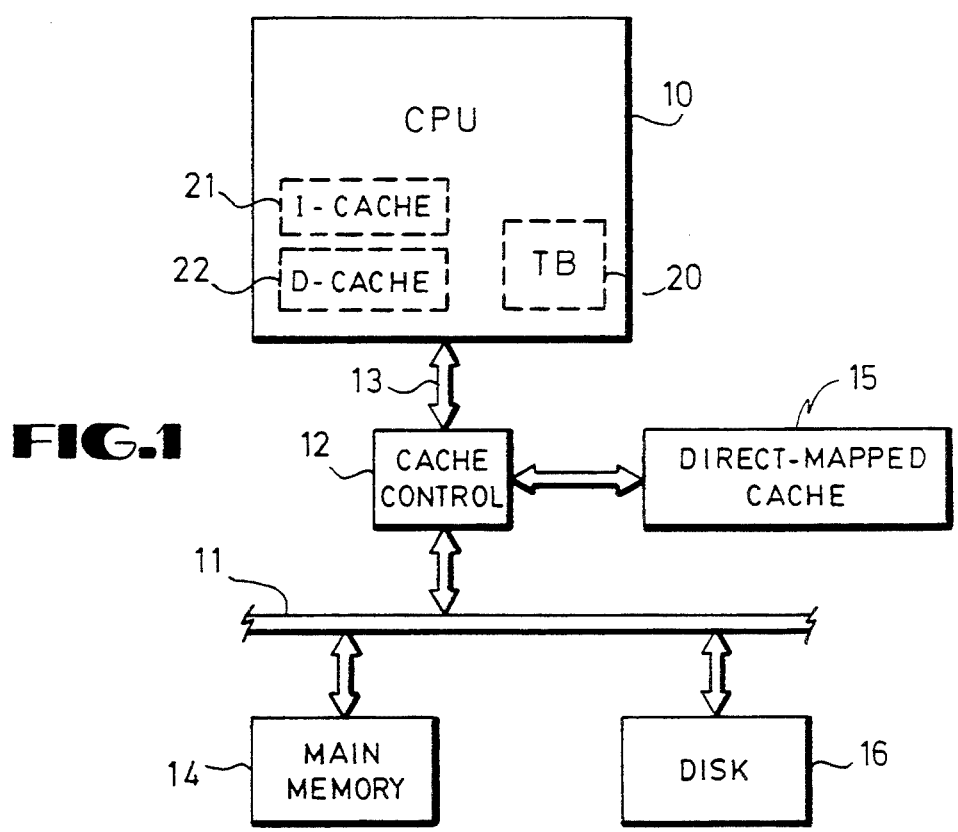
FIG. 1 is an electrical diagram in block form of a computer system which may employ the features of one embodiment of the invention.

Referring to FIG. 1, a computer system is illustrated which may employ the cache associativity method of the invention. A CPU 10 is coupled to a system bus 11 through a cache controller 12 and a CPU bus 13. A main memory 14 is connected to and accessed by the system bus 11, and a cache memory 15 is connected to the cache controller 12 so it is accessed directly by the CPU bus 13. The CPU 10 implements a virtual memory management system such as that provided by the UNIX ™ or VAX/VMS ™ operating systems, and so pages of data are swapped between physical memory provided by the main memory 14 and secondary storage in the form of a disk 16. The VAX architecture is described by Levy and Eckhouse in "Computer Programming and Architecture: The VAX", 2nd Ed., Digital Press, 1989, which is incorporated herein by reference. The CPU 10 may be of the VAX ™ type as disclosed by in the Levy et al text or in U.S. Pat. No. 5,006,980, issued to Sander, Uhler & Brown, assigned to Digital Equipment Corporation, the assignee of this invention, or preferably may be of an advanced 64-bit RISC type as disclosed in my copending application Ser. No.

547,630, filed Jun. 29, 1990, also assigned to Digital Equipment Corporation. Of course the CPU 10 may be of any one of a number of other types of construction capable of executing a virtual memory management system.

Figure 2:
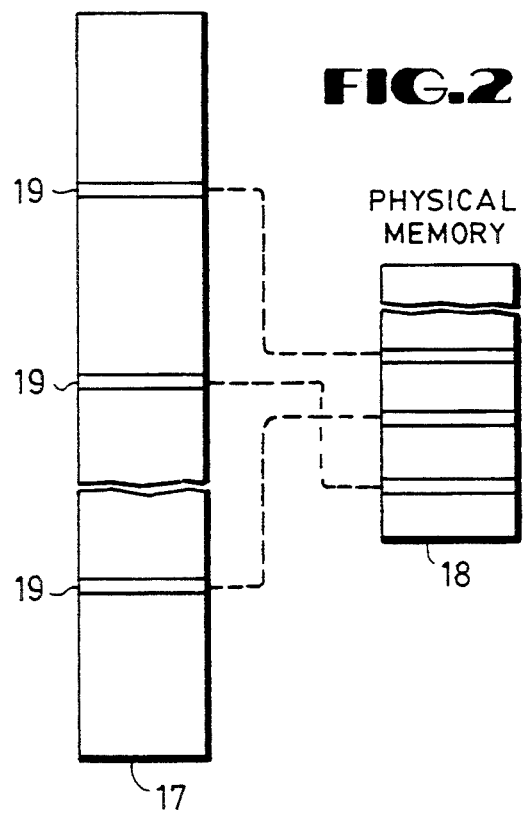
FIG. 2 is a diagram of memory mapping for a virtual memory scheme which may be used in the system of FIG. 1.

The CPU 10 generates memory references by first forming a virtual address, representing the address within the entire address range 17 as seen in FIG. 2, defined by the architectural specifications of the computer or that portion of it allowed by the operating system, then translating the virtual address to a physical address in an address map 18 constrained by the size of the main memory 14. The translation is done by pages, so a virtual page address for a page 19 in the virtual memory map 17 is translated to a physical address 19' for a page in the physical memory map 18. A page table is maintained in memory to provide the translation between virtual address and physical address, and usually a translation buffer 20, seen in FIG. 1, is included in the CPU to hold the most recently use translations so a reference to a table in memory 14 need not be made to obtain the translation before a data reference can be made. Only the pages used by tasks currently executing (and the operating system itself) are likely to be in the physical memory 14 at a given time; a translation to an address 19' is in the page table for only those pages actually present. When the page being referenced by the CPU 10 is found not to be in the physical memory 14, a page fault is executed to initiate a swap operation in which a page from the physical memory 14 is swapped with the desired page maintained in the disk memory 16, this swap being under control of the operating system.

The CPU of FIG. 1 may also have internal cache memory, including an instruction cache or I-cache 21, and a data cache or D-cache 22, as described in the above mentioned application Ser. No. 547,630, but these are not of concern in the operation of the direct-mapped cache 15 according to this embodiment of the invention. The memory used by the computer system of FIG. 1 is thus hierarchical, with the fastest being the internal caches 21 and 22, the next fastest being the cache 15, then the main memory 14, and finally the swap space in the disk 16. The difference in speed between the fastest and slowest is many orders of magnitude. The internal caches and the cache 15 are accessed within a few CPU cycles, while the main memory 14 is accessed in perhaps ten to one-hundred or more CPU cycles, and a page swap to disk 16 requires many hundreds or thousands of CPU cycles. The performance of the system therefore is highly dependent upon maintaining in the caches instructions and data that are currently being used. A subset of the data in the physical memory 14 (mapped to 18 of FIG. 2) is in the cache 15 at a given time, and a subset of the data in the cache 15 is in the internal caches 21 and 22.

The cache memory 15 is of the direct mapped type, and is constructed as seen in FIG. 3. The data is stored in an array of memory chips which may be depicted as an array 23 of rows 24, where each row has a number of blocks 25. Each block 25 contains, for example, 64-bytes or eight quadwords of data. A physical address 26 on the CPU bus 13 used to access the cache 15 (or main memory 14) contains a low-order field 27 which selects the byte (or word) within a block 25, a field 28 which selects the block 25 within a row 24, a field 29 which selects the row, and a tag field 30. The field 28 is applied to a decoder 31 to make the selection of the block within the row, and the field 29 is applied to a row decoder 32 to select the row for output to the decoder 31. The low-order bits of the address in field 27 are applied to a decoder 33 for selecting the byte or word within a block for coupling to the data bus in the CPU bus 13. In the cache controller 12, a tag store 34 holds a number of tags corresponding to the number of blocks 25, and the fields 28 and 29 from the address 26 on the address bus of the CPU bus 13 are used by row and column decoders 35 to select one of the tags for application to the tag compare circuit 36. The other input to the tag compare circuit 36 is the tag field 30 from the address 26. If the stored tag selected by decoders 35 and the tag field 30 match, a tag hit is signalled by output 37, and the data on output 38 from the data array 23 is used, otherwise a miss is signalled and the data output is discarded. When a miss occurs, a reference to memory 14 must be made and so the address is passed through the cache controller 12 to the system bus 11.

The cache 15 of FIG. 3 is direct-mapped, in that a first data item having a given value of the address bits in fields 28 and 29 must be stored in one and only one location (block 25) in the cache array 23. If a memory reference is made to a second memory location having the same value of address bits in fields 28 and 29, this will map to the same location as the first data item referred to, and so the first must be written over by the second. For example, if the task executing on the CPU 10 makes reference to the same index into two different pages having the same address bits in fields 28 and 29, then the block containing this index from the two pages will be repeatedly overwritten in cache, producing a thrashing condition. In contrast, a set associative cache allows a given address value to be mapped to more than one location in a cache array, so two addresses from different pages having a corresponding set of bits equal can exist in the cache at the same time. The hardware for implementing a direct-mapped cache as seen in FIG. 3 is faster in operation, however, compared to a set associative cache, because only one tag-compare operation is needed, as done in the compare circuit 36. In a set associative cache, the tag address must be compared with a number of possible matches, and then the corresponding data also selected (after the tag compare is completed); this additional step necessarily makes the operation slower.

As an example, assume that the page size in the virtual memory system executing on the computer system of FIG. 1 is 1K-bytes, so the low-order byte addresses (binary) repeat after a 10-bit address value. Also, assume that the configuration of the cache 15 is 2K-bytes such that the cache maps parts totalling 2K-bytes of the physical memory map 18 of FIG. 2, consisting at any given time of many blocks from different pages, but totalling two pages. A data item with a physical address beginning on a boundary with bits <10:0> zero in the binary address will always map to the first block in the cache 15. Thus physical addresses 0000, 2048, 4096, etc., will map in the same place in the cache, i.e., the fields 28 and 29 include bits <10:4> of the address 26, for example, which are identical. A task that alternately accesses physical locations 0000 and 2048 will therefore always produce a cache miss in the direct-mapped cache 15 of FIG. 3. In contrast, in a two-way associative cache (or one of higher associativity) the two data items can be maintained in cache at the same time so cache hits will be produced by repeated alternate accesses to these two physical addresses. Two or more locations repeatedly missing and displacing each other from a cache is called "thrashing".

According to the invention, if the cache 15 is large enough to hold N pages in the virtual memory management environment executing on the CPU 10, the pages are remapped to give the effect of N-way associativity. In the example, referring to FIG. 4, where the cache 15 can hold two of the 1K-byte pages, then the operating system can remap virtual pages to physical pages in the memory 14 (memory map 18) to give the desired effect of simulating two-way associativity. Virtual addresses 0000 and 2048 are in different virtual address pages, and can be mapped to two physical pages (such as page frame numbers 301 and 303) that map to the same locations in the cache 15. For such mapping, the direct-mapped cache 15 thrashes when repeated accesses are made to the virtual addresses 0000 and 2048. A different virtual-to-physical mapping (such as assigning page frame numbers 301 and 302, instead of 301 and 303) allows both pages to be in the 2K-byte cache 15 at the same time, and the cache gives the effect of a two-way associative cache. The same data that was in page frame number PFN 303 is rewritten to PFN 302 in the physical memory 14, thus a pair of blocks which previously mapped to an identical location in the cache 15 now map to different block locations. The sets of address bits of the physical addresses 26 for the two items will now have a bit that is different in the fields 28 and 29.

It is a simple task to copy the data and remap the page frame numbers assigned to virtual pages by the operating system (this function already exists in UNIX or VAX/VMS for remapping bad memory blocks, i.e., those exhibiting soft errors or the like). First, however, the data items that are trashing must be detected. The existence of these items is of course data-dependent, and applications software dependent, so prediction before runtime of when the condition will occur is virtually impossible; also, in another invocation of the software, the instances of thrashing will probably occur at different times and places in the program. The software in question must be running before it is known if the condition exists, and before the locality of each instance of the condition is known. One method of detecting the thrashing condition during runtime is to latch (in memory or in a register 39 seen in FIG. 3) a subset (such as 1-of-64, controlled by a 6-bit miss counter 40) of the addresses that produce a cache miss, and then by a timer interrupt routine read the addresses of this latch 39 periodically. Based upon this sample of the stream of miss addresses, the method implemented then selectively remaps the pages numbers (as in FIG. 4) to reduce thrashing. The purpose of sampling a subset of the miss-address stream is to avoid the timer interrupt routine always finding the address of the timer interrupt routine itself in the miss-address latch 39. The miss latch 39 and counter 40 can be constructed as part of the cache controller 12 or of the CPU 10, or can be separate hardware coupled to the CPU bus 13.

Figure 4:
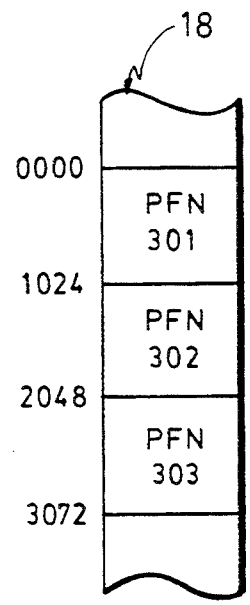
FIG. 4 is a diagram of a part of the main memory map when implementing the page number swapping operation according to one embodiment of the invention.

One remapping algorithm that may be used is to take 100-to-1000 samples per second of the miss latch 39 and remap each sampled page to a different physical memory location (different page frame) as depicted in FIG. 4. The algorithm for choosing the new PFN may be merely to decrement the existing PFN, and increment the displaced PFN. Another would be to use one of the "unallocated pages" in physical memory that the operating system keeps track of, i.e., give the page frame to be moved one of the unused page frame numbers, so there is then no displaced page that would have to be switched around. After the new numbers are thus assigned, the method will require moving a page or two pages to new locations in the physical memory 14. With a high probability, locations that are actively thrashing will end up being sampled and moved. Also, with high probability (at least after a few such moves), the thrashing pages will reach a cache configuration equivalent to that of a hardware N-way associative cache (where N is the number of pages that the direct-mapped cache 15 can hold), and thrashing will decrease.

Figure 5A:
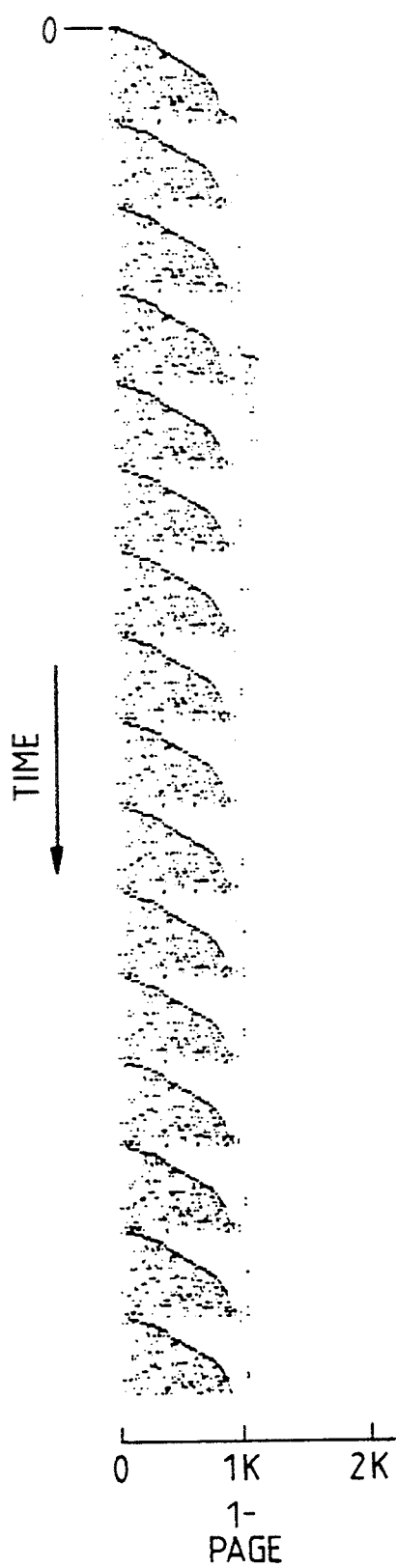
FIGS. 5a and 5b are diagrams of cache misses shown on a plot of cache address vs. time, for one system using the invention and another system not using the invention.

As a demonstration of the effect of employing the method of the invention, a recording of cache misses was plotted as seen in FIG. 5a, where the improvement is not being used. The coordinates of the plot are time, running top-to-bottom in the Figure, and cache memory address, running left-to-right; each mark is a cache miss, so the density of marks is an indication of the degree of thrashing—or the ideal would be no marks at all. In this example, an applications program is running that shows misses tracing a pattern that seems to fill up the cache to about one page level, then goes back to zero and starts to retrace the same general pattern. The second page of the cache, even though present, does not appear to be used in this trace, or at least almost no misses appear. No improvement in performance with time is seen in FIG. 5a; the initial pattern seems to repeat indefinitely.

Figure 5B:
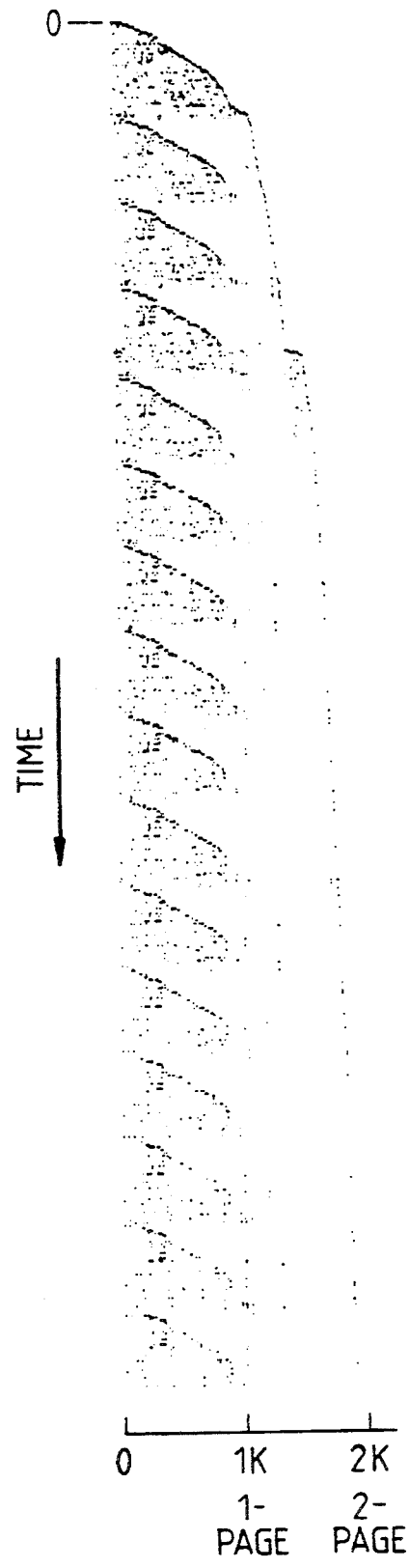

In contrast, in FIG. 5b, the cache size is the same, but the method of the invention is employed. Here, the first pattern is the same as FIG. 5a, at the top of the plot, then the second seems to start filling the second page of the cache, and gradually the number of misses (density of marks) decreases as the program continues to run, until at the bottom of the plot the density is markedly less. The total time of this plot is about 2-seconds, top to bottom. A characteristic of the use of the invention is that the execution of a program changes with time; the performance will improve if the pattern of addressing is such that thrashing would occur due to the phenomenon discussed above. In some programs, however, the addressing may be much more random, and the effect illustrated in FIGS. 5a and 5b would not occur. An experiment generating totally random addresses shows that the use of the method of the invention gives no improvement at all, and indeed there is a small performance penalty due to the time needed to move pages after detecting random thrashing. Almost all programs exhibit highly non-random patterns of addressing, however, due to the prevalence of loops, so most programs exhibit improvement in performance over time when the method of the invention is used.

The improved operation provided by the method of the invention allows a fast, simply-constructed, direct-mapped cache memory device to be used, while achieving cache-hit performance almost equivalent to that of slower, complex, N-way associative cache hardware. The overall performance from a speed standpoint is better than when a set associative cache is used, however, because the hardware delay inherent in a set associative cache is not present.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a computer system having a processor, a main memory for storing data, and a cache for storing data corresponding to said data stored at selected main memory addresses, said method comprising the steps of:
   A) accessing said cache to obtain a plurality of pages of data using said main memory addresses to identify a plurality of cache locations at which said pages may be stored;
   B) detecting each of a plurality of cache misses comprising cache accesses resulting in said pages not being found at said identified locations;
   C) storing a preselected subset of said main memory addresses used in said cache misses, said subset comprising more than one and less than the total number of said cache misses;
   D) sampling said stored main memory addresses at selected times; and
   E) moving said data at each said sampled main memory address to a different one of said main memory addresses.

2. A method according to claim 1 wherein said processor employs a virtual memory system, in which each said main memory address corresponding to a page frame number to which a virtual address is assigned, and said moving step comprises the step of assigning different virtual addresses to the page frame numbers corresponding to said data at each said sampled main memory address.

3. A method according to claim 1 wherein the data is stored in said main memory in a plurality of pages, each said page of said main memory corresponding to one of the main memory addresses, said cache holding at least two of said pages, and wherein said moving comprises moving the page at each main memory address.

4. A method according to claim 1 wherein said step of storing the main memory addresses includes latching the main memory address of each such cache miss.

5. A method according to claim 4 wherein said steps of sampling and moving includes periodically sampling said latched main memory address, and moving data corresponding to the sampled main memory address.

6. The method in accordance with claim 1, wherein said storing step comprises the steps of counting said cache misses and storing one of every N cache misses, where "N" is an integer greater than one and less than the total number of said cache misses.

7. In a computer system having a processor, a main memory for storing data, and a cache for storing data corresponding to said data stored at selected main memory addresses, a memory management apparatus comprising:
   A) access means coupled with said cache for accessing said cache to obtain a plurality of pages of data using said main memory addresses to identify a plurality of cache locations at which said pages may be stored;
   B) detector means coupled with said access means for detecting each of a plurality of cache misses comprising cache accesses resulting in said pages not being found at said identified locations;
   C) storing means coupled with said detector means for storing a preselected subset of said main memory addresses used in said cache misses, said subset comprising more than one and less than the total number of said cache misses;
   D) sampling means coupled with said storing means for sampling said stored main memory addresses at selected times; and
   E) means coupled with said sampling means for moving said data at each said sampled main memory address to a different one of said main memory addresses.

8. The apparatus in accordance with claim 7, wherein said storing means comprises a counter for counting said cache misses, and means for storing one of every N cache misses, where "N" is an integer greater than one and less than the total number of said cache misses.

9. The apparatus in accordance with claim 7, wherein said storing means comprises a miss latch for storing sequentially each said main memory address used in said cache misses.

10. The apparatus in accordance with claim 9, wherein said storing means comprises a counter for counting said cache misses, and means for storing one of every N cache misses, where "N" is an integer greater than one and less than the total number of said cache misses.

11. A system according to claim 7 wherein said processor employs a virtual memory system.

12. A system according to claim 11 wherein data is stored in said main memory in pages, and said pages are swapped between said main memory and a disk memory in employing the virtual memory system.

13. A system according to claim 7 wherein data is stored in said main memory in pages, each page having a main memory address, and said cache holds at least two of said pages, and wherein said means for moving comprises moving the page at each main memory address.

14. A system according to claim 7 wherein said means for determining the main memory address includes a latch for holding the main memory address of each such cache miss.

15. A method of operating a computer system comprising the steps of:
   a) storing data in a plurality of pages in a main memory which is accessible by a processor;
   b) storing in a cache a subset of said pages of data;
   c) generating a plurality of virtual addresses in said processor;
   d) translating said virtual addresses to main memory addresses for accessing said cache and said main memory;
   e) to each said page, assigning one of a plurality of page numbers for locating said page in said main memory;
   f) accessing the cache to obtain a plurality of pages of data using said main memory addresses to identify a plurality of cache locations at which the pages may be stored;
   g) detecting each of a plurality of cache misses comprising cache accesses resulting in the pages not being found at the identified locations;
   h) for every predetermined number of said detected cache misses, wherein said predetermined number is greater than one and less than the total number of detected cache misses, determining the main memory address at which said detected cache miss occurs, and, in a miss store, storing said determined main memory address at which said detected cache miss occurs;

i) reassigning a different page number to the page corresponding to each of a plurality of said main memory addresses stored in said miss store; and j) relocating said page having the reassigned page number to a different location in said main memory corresponding to said different page number.

16. A method according to claim 15 wherein said processor employs a virtual memory system and pages are swapped between said main memory and a disk memory.

17. A method according to claim 15 including storing in said cache at least two of said pages.

18. A method according to claim 14 wherein said step (h) includes latching the main memory address of each such cache miss.

19. A method according to claim 18 wherein said step of reassigning includes periodically sampling said latched main memory address, and using said latched main memory address from said periodic sampling in reassigning page numbers.

20. A computer system, comprising:
 a) a processor which generates a plurality of virtual addresses, employing a virtual memory system;
 b) a main memory coupled with said processor storing data in a plurality of pages accessible by said processor;
 c) a cache coupled with said processor storing a subset of said pages of data;
 d) means coupled with said main memory and said cache for translating said virtual addresses to a plurality of main memory addresses to access said cache and said main memory;
 e) means coupled with said translating means for assigning, to each page, one of a plurality of page numbers for locating said page in said main memory;
 f) means coupled with said cache for accessing said cache to obtain a plurality of pages of data using said main memory addresses to identify a plurality of cache locations at which the pages may be stored;
 g) means coupled with said accessing means and responsive to every predetermined number of a plurality of cache misses for determining the main memory address at which each said cache miss occurs, wherein said predetermined number is greater than one and less than the total number of cache misses, and wherein said cache misses comprise a plurality of cache accesses resulting in said pages not being found at the identified locations, said determining means comprising means for storing said determined main memory address at which said detected cache miss occurs;
 h) means coupled with said determining means for reassigning a different page number to the page corresponding to the main memory address at which each said cache miss occurs; and i) means coupled with said determining means for relocating each said page having the reassigned page number to a different location in said main memory corresponding to said different page number.

21. A system according to claim 20 wherein said pages in main memory are swapped between said main memory and a disk memory.

22. A system according to claim 20 wherein said cache holds at least two of said pages.

23. A system according to claim 22 wherein said means for determining includes a latch for holding main memory addresses of cache misses.

24. A system according to claim 23 wherein said means for relocating includes means for periodically sampling said latch, and said means for reassigning is responsive to said sampling means for reassigning such that the page corresponds to a different location in the cache.

25. A method of operating a computer system comprising the steps of:
 A) storing data in a plurality of locations of a main memory identified by a plurality of physical addresses, said main memory being accessible by said processor;
 B) maintaining a translation table for translating a plurality of virtual addresses into corresponding ones of said physical addresses, each said virtual address corresponding to one of a plurality of pages of data stored in said main memory;
 C) storing in a cache a subset of said pages of data at a plurality of cache locations accessible by said physical addresses, said cache storing cache information including a plurality of cache tags identifying data stored in cache locations;
 D) for fetching of selected ones of said pages of data from said cache, said processor translating said virtual addresses of said selected pages into physical addresses and using said physical addresses to access said cache by determining whether said physical addresses of said selected pages correspond to said cache information;
 E) tracking each occurrence wherein said physical addresses of said selected pages do not correspond to said cache information, each said occurrence being identified as a cache miss;
 F) storing a preselected subset of said physical addresses of said cache misses;
 G) sampling said stored physical addresses without regard to which said physical addresses and cache information are compared in identifying said cache misses;
 H) changing said translation table such that said sampled physical addresses correspond to different ones of said virtual addresses; and
 I) moving said pages corresponding to said sampled physical addresses to different locations in said main memory.

* * * * *